United States Patent [19]

Josephson

[11] Patent Number: 4,476,033
[45] Date of Patent: Oct. 9, 1984

[54] METHOD AND COMPOSITIONS FOR ACIDIZING AND FRACTURING WELLS

[75] Inventor: Charles B. Josephson, Bartlesville, Okla.

[73] Assignee: Phillips Petroleum Company, Bartlesville, Okla.

[21] Appl. No.: 403,373

[22] Filed: Jul. 30, 1982

[51] Int. Cl.$^3$ ............................................. E21B 43/27
[52] U.S. Cl. ................................. 252/8.55 C; 166/307
[58] Field of Search ................... 252/8.55 C, 8.55 R; 166/282, 307

[56] References Cited

U.S. PATENT DOCUMENTS

| | | | |
|---|---|---|---|
| 3,923,666 | 12/1975 | Dill | 252/8.55 C |
| 4,191,657 | 3/1980 | Swanson | 252/8.55 C |
| 4,349,443 | 9/1982 | Block | 252/8.5 |
| 4,366,070 | 12/1982 | Block | 252/8.5 |

*Primary Examiner*—Herbert B. Guynn
*Attorney, Agent, or Firm*—Howard D. Doescher

[57] ABSTRACT

Gelled-acid compositions suitable for matrix-acidizing or fracture-acidizing of subterranean formations and methods of using the composition in these operations are provided wherein the compositions comprise water, water-dispersible acrylamide-derived polymer, an acid and an aldehyde precursor which hydrolyzes in aqueous acid media to produce aldehydes which in turn react with the polymer and gels the resulting mixture.

15 Claims, No Drawings

METHOD AND COMPOSITIONS FOR ACIDIZING AND FRACTURING WELLS

This invention relates to methods of treating subterranean formations to enhance the production of hydrocarbons therefrom, and more particularly, to methods for acidizing and acid fracturing, and to the compositions used in such methods.

In accordance with one aspect, this invention relates to gelable acidic compositions comprising an aqueous mixture containing a water-dispersible acrylamide-derived polymer, an acid, and one or more acid-labile aldehyde precursors which react in an acid mixture to produce aldehydes in situ. In accordance with a further aspect, this invention relates to a gelable acidic composition which gels during or after injection into a subterranean formation. In accordance with a further aspect, this invention relates to methods of acidizing and acid fracturing subterranean formations with gelable aqueous acid compositions containing acid-labile aldehyde precursors so as to delay gelation of the acid mixture thereby providing mixtures which can be introduced into a porous formation with less pumping energy.

The use of gelled acidic compositions for treating subterranean formations to enhance the production of hydrocarbons therefrom is known. Various gelling agents have been added to polymer-containing aqueous acid compositions which form suitable gels for introduction into a subterranean formation. In the usual formation of gelled compositions, a suitable gelling agent is initially combined with the composition to be gelled and this requires injection of a gelled composition into a subterranean formation. This requires considerble pumping energy for forcing the gelled composition into the formation. In accordance with the invention, pumping is made easier by delaying the gelation of the aqueous acid composition so that the composition is gelled during and even after injection into a subterranean formation.

Accordingly an object of this invention is to provide improved gelled acidic compositions for treatment of subterranean formations.

Another object of this invention is to provide compositions for introduction into subterranean formations wherein gelation of the composition is delayed until introduction into the formation.

Other objects, aspects, as well as the several advantages of this invention will be apparent to those skilled in the art upon reading the specification and the appended claims.

In accordance with the invention, acid-labile aldehyde precursors, i.e., derivatives of aldehydes, are incorporated into gelable aqueous acid systems containing acrylamide-derived polymers so as to delay gelation of the composition until it is desired to have the composition gelled.

More specifically in accordance with the invention, gelable aqueous acidic compositions containing acrylamide-derived polymers for combining with acid-labile precursors or derivatives of aldehydes which react in an acid mixture to produce aldehydes which in turn react with polymer to cause gelation of the composition.

The use of acid-labile precursors such as aldehyde derivatives permit regulation of gelation thereby preventing premature gelation of the composition in the tubing and well bore prior to its entry into the formation.

Further in accordance with the invention, a method is provided for preparing a gelled acid useful for acidizing or fracturing subterranean earth formations which comprises mixing a water-soluble acrylamide-derived polymer with an aqueous acid solution containing an acid-labile precursor such as an aldehyde derivative which reacts in said acid mixture to produce aldehydes and allowing said produced aldehydes to react with said polymer to gel said mixture.

In a preferred mode of operation for forming the gelled acid composition, a mixture of polymer, acid and aldehyde precursor is injected into a subterranean formation so that during injection the aldehyde precursor reacts to produce aldehydes which in turn react with the polymer to gel the mixture during introduction or after introduction into the subterranean formation.

The gelled-acid compositions of the invention are suitable for matrix-acidizing or fracture-acidizing of subterranean formations. In order to satisfy this requirement, the polymer, the acid, and the aldehyde precursor, in the amounts used, must be sufficiently compatible with each other, in an aqueous dispersion thereof, to permit the gelation of said dispersion and thus form a composition having sufficient stability to degeneration by the heat of the formation to permit good penetration of the composition into the formation. Furthermore, once penetration has been attained the stability must be sufficient to permit the maintaining of the composition in contact with the formation for a period of time sufficient for the acid in the composition to significantly react with the acid-soluble components of the formation and stimulate the production of fluids therefrom, for example, by creating new passageways or enlarging existing passageways through the formation.

The term "polymer" is employed herein generically to include both homopolymers and copolymers and the term "water dispersible polymers" is employed herein generically to include those polymers which are truly water soluble and those polymers which are dispersible in water or other aqueous medium to form stable colloidal suspensions which can be gelled as described herein. Also, the term "aqueous dispersion" is employed generically to include both true solutions and stable colloidal suspensions of the components of the compositions of the invention which can be gelled.

Any suitable acrylamide-derived polymer meeting the above compatibility requirements can be used in the practice of the invention. Thus, under proper conditions of use such polymers can include various polyacrylamides and related polymers which are water dispersible and can be used in an aqueous medium with the gelling agents described herein to give an aqueous gel. These can include the various substantially linear homopolymers and copolymers of acrylamide and methacrylamide. Various methods are known in the art for preparing polymers including homopolymers and copolymers that can be used in the invention, for example, see U.S. Pat. No. 4,191,657 and patents referred to therein, all of which are incorporated herein by reference.

The amount of the acrylamide-derived polymers used in preparing the gelled-acid compositions of the invention can vary widely depending upon the particular polymer used, the purity of the polymer and properties desired in the final composition. In general, the amount of polymer used will be a water-thickening amount, i.e., at least an amount which will significantly thicken the water to which it is added. For all practical purposes, the amount of polymer employed in the instant compositions will generally be within the range of from 0.2 to about 3 weight percent based upon the total weight of the composition with from 0.75 to about 2 weight percent being preferred.

Acids useful in the practice of the invention include any acid meeting the above-stated compatibility requirements and which is effective in increasing the flow of fluids, e.g., hydrocarbons, through the formation and into the well. Thus, under proper conditions of use, examples of such acids can include inorganic acids, such as hydrochloric acid, phosphoric acid, nitric acid, and sulfuric acid. In addition $C_1$–$C_4$ organic acids such as formic acid, acetic acid, propionic acid, butyric acid, and mixtures thereof in combination with inorganic acids are also suitable. The non-oxidizing acids are preferred. The concentration or strength of the acid can vary depending upon the type of acid, the type of formation being treated, the above-stated compatibility requirements and the results desired in the particular treating operation. Generally speaking, the concentration of the acid can vary from 0.4 to about 60 weight percent depending upon the type of acid with concentrations within the range of 10 to 50 weight percent usually preferred based upon the total weight of the gelled-acid composition. A presently preferred concentration is in the range from 0.4 to about 35 weight percent. The acids used in the practice of the invention can contain any of the known corrosion inhibitors, emulsifying agents, sequestering agents, surfactants, friction reducers, etc. known in the art and which meet the above stated compatibility requirements.

Any suitable water-dispersible aldehyde precursor meeting the above-stated compatibility requirements can be used in the practice of the invention.

Aldehyde precursors suitable for use in the present invention include aldehyde derivatives which are hydrolyzed in aqueous acid media to liberate the free aldehyde. In general, such derivatives include acetals, hemiacetals, enol esters, reducing sugars, oximes, semicarbazones, hydrazones, phenylhydrazones and the like.

Suitable acetals of monoaldehydes are described by the formula (A) wherein $R_1$ is hydrogen or a group selected from alkyl, aralkyl, alkoxyalkyl and alkenyl groupings containing 1 to 8 carbon atoms and $R_2$ and $R_3$ which may be the same or different are selected from alkyl radicals containing one to four carbon atoms with the proviso that the total number of carbons in $R_2$ and $R_3$ does not exceed 6. Additional suitable acetals can include cyanoacetals such as 4,4-dimethoxybutyronitrile and 4,4-diisopropyoxybutyronitrile as disclosed in U.S. Pat. No. 3,466,317. In this regard, $R_1$ in formula (A) represents cyanoalkyl groupings containing 3 to 7 carbon atoms.

(A)

Representative acetals of monoaldehydes include acetaldehyde diethyl acetal, phenylacetaldehyde dimethyl acetal, formaldehyde dimethyl acetal, 2-methoxyacetaldehyde dimethyl acetal, acrolein diethyl acetal and the like.

Paraformaldehyde and trioxane which may be considered as linear or cyclic acetals can be used in the present process. In addition suitable acetals of polyols such as water-dispersible polyvinyl alcohols—as well as 1,2- or 1,3-diols containing 3 to 6 carbon atoms can be used in the instant teaching. These acetals must be water soluble or at least water dispersible to be useful herein.

Suitable acetals of dialdehydes are described by the formula

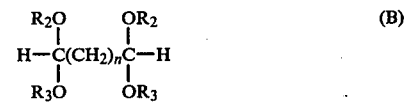
(B)

wherein n is zero or an integer over the range of 1 to 3 and $R_2$ and $R_3$ are defined as above. Representative acetals of dialdehydes include malonaldehyde tetramethyl acetal, glyoxal tetraethyl acetal, glutaraldehyde tetramethyl acetal, malonaldehyde 1,1,3-trimethyl-3-ethyl acetal, and the like.

Suitable enol esters are described by the formula (C)

wherein $R_4$ is an acyl radical containing 2 to 4 carbon atoms and $R_5$ and $R_6$ are hydrogen or alkyl radicals containing 1 to 3 carbon atoms with the proviso that the total number of carbon atoms does not exceed 10. Representative enol carboxylates include vinyl acetate, vinyl butyrate, 1-propenyl propionate, 1-butenyl acetate and the like.

Reducing sugars such as monosaccharide aldoses and disaccharides containing hemiacetal linkages are also suitable for use in the present invention. Representative examples of monosaccharide aldoses include glucose, mannose, galactose, xylose, arabinose and the like. Representative examples of disaccharides containing hemiacetal linkages which can be used in the present invention include maltose, lactose and the like. Acylated sugar derivatives such as glucose pentaacetate can also be used as the "aldehyde precursor" in the present process.

It is contemplated that other aldehyde derivatives such as oximes, semicarbazones, hydrazones, phenylhydrazones and the like can be used in the instant process. Solvolysis of these derivatives in the aqueous acid media of the instant process would liberate aldehyde to take part, e.g., in the cross-linking reaction between aldehyde and polyacrylamide to provide the subject gelled acids.

Any suitable amount of aldehyde precursor can be used in the practice of the invention. In all instances the amount of aldehyde precursor used will be a small but effective amount which is sufficient to cause gelation of an aqueous dispersion of the polymer, the acid, and the aldehyde precursor. As a general guide the amount of aldehyde precursor used in preparing the gelled-acid copositions of the invention will be in the range of from 0.001 to about 5, preferably 0.004 to about 2 weight percent based on the total weight of the composition.

The gelled-acid compositions of the invention are aqueous compositions. They normally contain a significant amount of water. The amount of water can vary widely depending upon the concentration of the other components in the compositions, particularly the concentration of the acid.

Any suitable method can be employed for preparing the gelled-acid compositions of the invention. Thus, any suitable mixing technique or order of addition of the components which will provide compositions having sufficient thermal stability can be used. Such stability permits good penetration of the composition into the formation with significant etching of the formation.

The gelable acidic compositions of the invention can be prepared on the surface in any suitable tank equipped with suitable mixing means and then pumped down the well and into the formation employing conventional equipment for pumping acidic compositions. However, it is within the scope of the invention to prepare said compositions while they are being pumped down the well. This technique is sometimes referred to as "on the fly". For example, a solution of the polymer in water can be prepared in a tank adjacent to the wellhead. Pumping of the solution through a conduit to the wellhead can then be started. Then a few feet downstream from the tank a suitable connection can be provided for introducing either the acid or the aldehyde precursor into the conduit preferably as an aqueous solution. By so operating, delay of gelation is accomplished since the aldehyde precursor reacts in the presence of the acid to form the aldehyde which then in turn reacts with the polymer to gel the composition.

The following examples will serve to further illustrate the invention and should not be considered as unduly limiting on the invention.

In carrying out the examples the following general procedure was employed.

A 3.0 weight percent stock solution of polymer or copolymer was prepared at ambient temperature in deionized water. A weighed portion of this stock solution in a beaker was admixed with sufficient water and concentrated hydrochloric acid (37 weight percent HCl), e.g., to give the desired polymer concentration and acid concentration in individual samples for the test runs. Sufficient aldehyde precursor such as aldehyde acetals and water was added to the acid and polymer-containing solution to give about 75 mL of solution. After addition of the aldehyde precursor, the solutions were stirred for about 20 seconds before transferring a 15 mL portion thereof into a Kimax No. 500 capillary viscometer in a water bath at about 70 F. for viscosity measurements which are reported herein as the efflux time in seconds corresponding to the time required for the fluid level to drop from one mark to another mark on the capillary arm of the viscometer. The temperature of the water bath was increased at a rate sufficient for the bath temperature to reach about 200 F. in about one hour. During this heating period, the efflux time of the sample was measured at different temperatures over the entire temperature range. The temperature at which little or no movement of the fluid in the capillary could be detected was designated as the gelation temperature. The onset of gelation was signaled by an increase in the efflux time over a temperature interval and this interval is indicated in the examples.

The following examples demonstrate the gelling of thickened aqueous acids with aldehyde precursors such as aldehyde acetals.

EXAMPLE I

A test mixture was prepared by mixing 25 g of a 3 weight percent aqueous solution of Reten ®547 (Hercules copolymer of acrylamide and 2-acrylamido-2-methylpropane sulfonic acid sodium salt 30:70), 48 mL of 37 weight percent HCl, 0.9 mL water and 1.1 mL of acetaldehyde diethyl acetal. The mixture was stirred, and then 15 mL of the mixture was transferred to a Kimax size 500 capillary viscometer to establish gelation time in accordance with the above-described experimental procedure. A well-defined gel was noted 6.5 minutes from the time of addition of the acetal at a bath temperature of about 74 F. The onset of gelation was signaled by the increase in efflux time from 12.4 seconds (4 minutes after adding the acetal) to 38.3 seconds (5 minutes after adding the acetal). The unheated portion of the test mixture gelled 8 minutes after mixing.

EXAMPLE II

A test mixture was prepared by mixing 25 g of a 3 weight percent aqueous solution of Reten ®547, 48 mL of 37 weight percent HCl, 0.7 mL water and 1.29 mL of phenylacetaldehyde dimethyl acetal. The mixture was stirred and then 15 mL was transferred to a capillary viscometer to establish gelation time as described in Example I. Since the aldehyde acetal tended to separate as an oily layer, the mixture had to be vigorously stirred for several minutes before placing it in the viscometer. A gel was noted in the viscometer after a period of 18 minutes from the time of addition of the acetal at a bath temperature of about 110 F. The onset of gelation was signaled by the increase in efflux time from 13.4 seconds (15 minutes after addition of the acetal) to 23.7 seconds (16 minutes after addition of the acetal). The unheated portion of the test mixture gelled at about 18 minutes after mixing.

EXAMPLE III

A test mixture was prepared by mixing 25 g of a 3 weight percent aqueous solution of Reten ®547, 48 mL of 37 weight percent HCl, 1.3 mL water and 0.69 mL formaldehyde dimethyl acetal. The mixture was stirred and then 15 mL was transferred to a capillary viscometer to establish gelation time as described in the previous examples. A gel was noted in the viscometer 34.5 minutes after addition of the acetal at a bath temperature of about 145 F. After approximately 70 minutes at ambient temperature, the remainder of the original test mixture was beginning to gel.

EXAMPLE IV

A test mixture was prepared by mixing 25 g of a 3 weight percent aqueous solution of Reten ®547, 48 mL of 37 weight percent HCl, 1 mL water and 1 mL of 2-methoxyacetaldehyde dimethyl acetal. The mixture was stirred and then 15 mL was transferred to a capillary viscometer to establish gelation time and temperature as described in the previous examples. A gel was detected in the viscometer 26 minutes after addition of the acetal at a bath temperature of about 144 F. The unheated portion of the test mixture gelled in about 69 minutes after mixing.

EXAMPLE V

A test mixture was prepared by mixing 25 g of a 3 weight percent aqueous solution of Reten ®547, 48 mL of 37 weight percent HCl, 1.3 mL water and 0.72 mL of vinyl acetate monomer. The mixture was stirred and then 15 mL was transferred to a capillary viscometer to establish gelation time as described in the previous examples. A gel was detected in the viscometer 11.5 minutes after addition of the monomer at a bath temperature of about 100 F. The onset of gelation was signaled by the increase in efflux time from 12.6 seconds (7 minutes after addition of the monomer) to 77.6 seconds (8 minutes after addition of the monomer).

EXAMPLE VI

A test mixture was prepared by mixing 25 g of a 3 weight percent aqueous solution of Reten ®547, 48 mL of 37 weight percent HCl, 0.8 mL water and 1.19 mL of acrolein diethyl acetal. The mixture was stirred and then 15 mL was transferred to a capillary viscometer to establish gelation time as described in the previous examples. A gel was noted in the viscometer 33 minutes after addition of the acetal at a bath temperature of about 156 F. The unheated portion of the test mixture gelled in about 95 minutes after mixing.

EXAMPLE VII

A test mixture was prepared by mixing 25 g of a 3 weight percent aqueous solution of Reten ®547, 48 mL of 37 weight percent HCl, and 3.03 g glucose pentaacetate dissolved in about 2 mL of acetone. The mixture was stirred and then 15 mL was transferred to a capillary viscometer to establish gelation time and temperature as described in the general experimental procedure. A gel was noted in the viscometer 74.5 minutes after addition of the acetate at a bath temperature of about 200 F. The onset of gelation was signaled by the increase in efflux time from 21.9 seconds (70 minutes after addition of the acetate) to 50.5 seconds (71 minutes after addition of the acetate). The unheated portion of the test mixture had not gelled in about 330 minutes after mixing.

EXAMPLE VIII

A test mixture was prepared by mixing 25 g of a 3 weight percent aqueous solution of Reten ®545, (Hercules copolymer of acrylamide and 2-acrylamido-2-methylpropane sulfonic acid sodium salt 50:50), 48 mL of 37 weight percent HCl, 2 mL water and 1.4 g of D-glucose. The mixture was stirred and then 15 mL was transferred to a capillary viscometer to establish gelation time and temperature as described in the general experimental procedure. A gel was noted in the viscometer 85 minutes after addition of the glucose at a bath temperature of about 200 F. The onset of gelation was signaled by the increase in efflux time from 3.3 seconds (75 minutes after addition of the glucose) to 47.1 seconds (78 minutes after addition of the glucose). The unheated portion of the test mixture had not gelled at ambient temperature even after standing for several days.

EXAMPLE IX

A test mixture was prepared by mixing 56 mL of water, 94 mL of concentrated hydrochloric acid and 1.5 g of Reten ®547. The mixture was heated to 130 F. and a 0.47 g sample of powdered paraformaldehyde (linear polymer of formaldehyde) was added. The stirred mixture formed a solution in about 3.5 minutes. A 15 mL portion of this solution was transferred to a capillary viscometer in a hot water bath at 130 F. A gel was noted in the viscometer 12 minutes after addition of the paraformaldehyde at a temperature of about 147 F. The onset of gelation was signaled by the increase in efflux time from 20.4 seconds (7 minutes after adding the paraformaldehyde) to 111 seconds (8 minutes after adding the paraformaldehyde).

The results obtained in the working examples are summarized in Table I.

TABLE I

| Example No. | Aldehyde Precursor | Gel Time (min)[a] | Gel Temperature (°F.)[b] |
|---|---|---|---|
| I | Acetaldehyde Diethyl Acetal | 6.5 | 74 |
| II | Phenylacetaldehyde Dimethyl Acetal | 18 | 110 |
| III | Formaldehyde Dimethyl Acetal | 34.5 | 145 |
| IV | 2-Methoxyacetaldehyde Dimethyl Acetal | 26 | 144 |
| V | Vinyl Acetate[c] Monomer | 11.5 | 100 |
| VI | Acrolein Diethyl Acetal | 33 | 156 |
| VII | Glucose Pentaacetate | 74.5 | 200 |
| VIII | D-Glucose | 85 | 200 |
| IX | Paraformaldehyde[d] | 12 | 147 |

[a]Gel time indicates the elapsed time between addition of the aldehyde precursor and the appearance of a gel in the viscometer.
[b]Gel temperature is the temperature of the water bath at which a gel became clearly evident in the capillary viscometer.
[c]Vinyl acetate is an enol ester which hydrolyzes to liberate acetaldehyde and acetic acid.
[d]Paraformaldehyde is a linear polymer of formaldehyde which hydrolyzes to liberate formaldehyde.

That which is claimed is:

1. A gelable acidic composition, suitable for matrix-acidizing or fracture-acidizing of a porous subterranean formation susceptible of attack by an acid and which gels upon injection into a subterranean formation, comprising:
   (a) water;
   (b) a water-thickening amount ranging from 0.2 to about 3 weight percent of a water-dispersible acrylamide-derived polymer;
   (c) from 0.4 to about 60 weight percent of a non-oxidizing acid which is capable of reacting with a significant amount of the acid-soluble components of said formation; and
   (d) from 0.001 to about 5 weight percent of at least one aldehyde precursor which hydrolyzes in aqueous acid media to produce aldehydes "in situ" which in turn react with the polymer and cause gelation of the mixture, said aldehyde precursor being selected from the group consisting of
   (1) acetals of an aldehyde having the formula

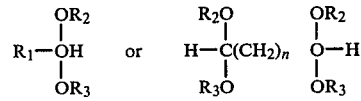

wherein $R_1$ is selected from hydrogen, alkyl, aralkyl, alkoxyalkyl, and alkenyl groups having from 1 to about 8 inclusive carbon atoms, $R_2$ and $R_3$ can be the same or different and selected from alkyl groups having from 1 to about 4 inclusive carbon atoms with the proviso that the total number of carbon atoms in $R_2$ and $R_3$ does not exceed about 6 and n ranges from 0 to 3
   (2) enol esters having the formula

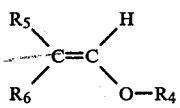

wherein $R_4$ is an acyl radical containing 2 to 4 carbon atoms and $R_5$ and $R_6$ are hydrogen or alkyl radicals containing 1 to 3 carbon atoms with the proviso that the total number of carbon atoms does not exceed 10

(3) reducing sugars selected from monosaccharide aldoses and disaccharides containing hemiacetal linkages (4) acetals or polyvinyl alcohols or an acetal of 1,2- or 1,3-diols containing 3 to 6 carbon atoms, and (5) cyanoacetal having the formula

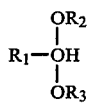

wherein $R_1$ represents cyanoalkyl groupings containing 3 to 7 carbon atoms, and $R_2$ and $R_3$ can be the same or different and are selected from alkyl groups having from 1 to about 4, inclusive, carboon atoms with the proviso that the total number of carbon atoms in $R_2$ and $R_3$ does not exceed about 6.

2. A composition according to claim 1 wherein, based on the total weight of the composition, the amounts of
   (b) range from 0.75 to about 2 weight percent;
   (c) range from 0.4 to about 35 weight percent; and
   (d) range from 0.004 to about 2 weight percent.

3. A composition according to claim 1 wherein (b) is an acrylamide copolymer.

4. A composition according to claim 1 wherein (d) is acetaldehyde diethyl acetal, phenylacetaldehyde dimethyl acetal, formaldehyde dimethyl acetal, 2-methoxyacetaldehyde dimethyl acetal, and acrolein diethyl acetal.

5. A composition according to claim 1 where (d) is vinyl acetate monomer.

6. A composition according to claim 1 wherein (d) is D-glucose or glucose pentaacetate.

7. A method for preparing a gelled acid useful for acidizing or fracturing subterranean formations which comprises:

mixing a water-soluble linear polyacrylamide, an aqueous acid solution and an aldehyde precursor as defined in claim 1 which hydrolyzes in an aqueous acid media to produce aldehydes in situ which in turn react with the polymer and gels the mixture; and allowing sufficient time for the mixture thus formed to hydrolyze and react to form said gel.

8. A method according to claim 7 wherein the mixture formed is injected into a subterranean formation and allowed to form a gel during introduction into the formation.

9. A method according to claim 7 wherein the gelled acidic composition is prepared and injected into the formation by the following combination of steps:

(a) dispersing said polymer in an aqueous solution of the acid;

(b) pumping water and acid into a well via a suitable conduit; and (c) then introducing the aldehyde precursor into the conduit during the pumping under conditions which cause hydrolysis of the precursor in the aqueous acid medium to form aldehydes which in turn react with the polymer and cause gelation of the mixture during its introduction into the formation.

10. A method for acid-treating a porous subterranean formation susceptible of attack by an acid and penetrated by a well bore which method comprises:

(1) injecting into said formation via said well bore a gelable acidic composition comprising:

(a) water;

(b) a water-thickening amount ranging from 0.2 to about 3 weight percent of a water-dispersible acrylamide-derived polymer;

(c) from 0.4 to about 60 weight percent of a nonoxidizing acid which is capable of reacting with a significant amount of the acid-soluble components of said formation; and (d) from 0.0001 to about 5 weight percent of at least one aldehyde precursor which hydrolyzes in aqueous acid media to produce aldehydes "in situ" to react with the polymer and gels the mixture during and/or after injection into the formation, said aldehyde precursor being selected from the group consisting of (1) acetals of an aldehyde having the formula

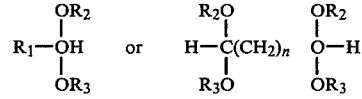

wherein $R_1$ is selected from hydrogen, alkyl, aralkyl, alkoxyalkyl, and alkenyl groups having from 1 to about 8 inclusive carbon atoms, $R_2$ and $R_3$ can be the same or different and selected from alkyl groups having from 1 to about 4 inclusive carbon atoms with the proviso that the total number of carbon atoms in $R_2$ and $R_3$ does not exceed about 6 and n ranges from 0 to 3

(2) enol ester having the formula

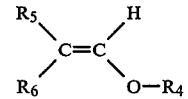

wherein $R_4$ is an acyl radical containing 2 to 4 carbon atoms and $R_5$ and $R_6$ are hydrogen or alkyl radicals containing 1 to 3 carbon atoms with the proviso that the total number of carbon atoms does not exceed 10.

(3) reducing sugars selected from monosaccharide aldoses and disaccharides containing hemiacetal linkages (4) acetals of polyvinyl alcohols or an acetal of 1,2- or 1,3-diols containing 3 to 6 carbon atoms, and (5) cyanoacetal having the formula

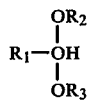

wherein $R_1$ represents cyanoalkyl groupings containing 3 to 7 carbon atoms, and $R_2$ and $R_3$ can be the same or different and are selected from alkyl groups having from 1 to about 4, inclusive, carbon atoms with the proviso that the total number of carbon atoms in $R_2$ and $R_3$ does not exceed about 6

(2) maintaining said composition in said formation to contact therewith for a period of time sufficient to form a gelled mixture and for the acid in said composition to react significantly with the acid-soluble components of said formation and stimulate the production of fluids therefrom.

11. A method according to claim 10 wherein:

the amount of said polymer is within the range of from 0.75 to about 2 weight percent based on the total weight of said composition, the amount of said acid is within the range of from 0.4 to 35 weight percent based on the total weight of said composition; and the amount of said aldehyde precursor is within the range of from 0.004 to 2 weight percent based upon the total weight of said composition.

12. A method according to claim 10 wherein said acid is hydrochloric acid.

13. A method according to claim 10 wherein said polymer is an acrylamide copolymer and wherein said acid is hydrochloric acid.

14. A method according to claim 10 wherein (d) is acetaldehyde diethyl acetal, phenylacetaldehyde dimethyl acetal, formaldehyde dimethyl acetal, 2-methoxyacetaldehyde dimethyl acetal, acrolein diethyl acetal, paraformaldehyde, and trioxane.

15. A method according to claim 10 wherein (d) is a vinyl acetate monomer.

* * * * *

UNITED STATES PATENT AND TRADEMARK OFFICE
CERTIFICATE OF CORRECTION

PATENT NO.   :   4,476,033
DATED        :   October 9, 1984
INVENTOR(S)  :   CHARLES B. JOSEPHSON It is certified that error appears in the above-identified patent and that said Letters Patent is hereby corrected as shown below:

Column 8, line 56 change "OH" to ---CH---

Column 8, line 56 change "O-H" to ---CH---

Column 9, line 22 change "OH" to ---CH---

Column 10, line 36 change "OH" to ---CH---

Column 10, line 36 change "O-H" to ---CH---

*Signed and Sealed this*

*Seventh* Day of *May 1985*

[SEAL]

*Attest:*

DONALD J. QUIGG

*Attesting Officer*   *Acting Commissioner of Patents and Trademarks*